0

(12) United States Patent
Archer et al.

(10) Patent No.: US 8,069,093 B2
(45) Date of Patent: *Nov. 29, 2011

(54) WEBSITE USER ACCOUNT LINKING

(75) Inventors: Jaime Archer, Palatine, IL (US); David Ding-hua Tzau, Vernon Hills, IL (US)

(73) Assignee: CDW LLC, Vernon Hills, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/698,267

(22) Filed: Feb. 2, 2010

(65) Prior Publication Data

US 2010/0131392 A1 May 27, 2010

Related U.S. Application Data

(63) Continuation of application No. 11/453,527, filed on Jun. 15, 2006, now Pat. No. 7,660,748.

(60) Provisional application No. 60/697,131, filed on Jul. 7, 2005.

(51) Int. Cl.
*G06Q 30/00* (2006.01)
(52) U.S. Cl. ........................ 705/26.82; 705/30; 705/27.1
(58) Field of Classification Search ..................... 705/26, 705/27, 30
See application file for complete search history.

(56) References Cited

U.S. PATENT DOCUMENTS

| | | | | |
|---|---|---|---|---|
| 5,621,201 | A * | 4/1997 | Langhans et al. | ............. 235/380 |
| 5,970,475 | A | 10/1999 | Barnes et al. | |
| 7,050,996 | B1 * | 5/2006 | Blagg et al. | ...................... 705/30 |
| 7,383,212 | B1 * | 6/2008 | Cleveland et al. | ............. 705/35 |
| 7,660,748 | B2 | 2/2010 | Archer et al. | |
| 2002/0049806 | A1 * | 4/2002 | Gatz et al. | ..................... 709/203 |
| 2002/0099659 | A1 | 7/2002 | Swentor | |
| 2003/0018567 | A1 * | 1/2003 | Flitcroft et al. | ................. 705/37 |
| 2004/0168066 | A1 | 8/2004 | Alden | |
| 2005/0010483 | A1 | 1/2005 | Ling | |
| 2005/0102154 | A1 | 5/2005 | Dodd et al. | |

OTHER PUBLICATIONS

Marlin, Steven; "Card Processor Brings CRM to Account Management," Bank Systems +Technology; May 2000; v37n5p58; Dialog file 16 #07346701, 3pgs.*
Marlin, "Card Processor Brings CRM to Account Management," Bank Systems+Technology, May 2000, v37n5p58, Dialog file 16 #07346701, 3 pages.
International Search Report and Written Opinion for Application No. PCT/US06/23352 dated Feb. 8, 2007.

* cited by examiner

*Primary Examiner* — Robert M. Pond
(74) *Attorney, Agent, or Firm* — Marshall, Gerstein & Borun LLP

(57) ABSTRACT

A method for managing a plurality of commercial website accounts maintained by a supplier of goods or services includes receiving a structure via a first computer screen, where the structure specifies a relationship between a first one of the plurality of commercial website accounts and a second one of the plurality of commercial website accounts, so that the first one of the plurality of website accounts is configured to be a parent account of the second of the plurality of website accounts defining a child account; linking the child account and the parent account in accordance with the received structure in response to a command received via the first computer screen; receiving a rule that regulates a purchase of goods or services by a user of the child account via a second computer screen, where the received rule specifies an action associated with a user of the parent account; automatically detecting that the user of the child account has placed an order at the commercial website; and processing the order in accordance with the rule and the structure.

20 Claims, 9 Drawing Sheets

FIG. 10

| View Orders | Reports | Workflow |

Order Details:

Order Number          Order Date
1234                  06/04/04

| Billed From Address | Billing Address | Shipping Address | Shipping Method | Payment Method |
| --- | --- | --- | --- | --- |
| | XYZ Inc. 2 Lane St. Chicago, Ill. | XYZ Inc. 2 Lane St. Chicago, Ill. | | Credit Card |
| | [Edit] ~158 | [Edit] | [Edit] | [Edit] |

160

| Date | Name | Status | Rule | Comments |
| --- | --- | --- | --- | --- |
| 06/04/04 | J. Jackson | Purchased | 1 | |
| 06/10/04 | T. Gray | Approved | 1 | |
| 06/15/04 | W. Smith | Pending Approval | 1 | |

162

| | Quantity | Product Description | Price |
| --- | --- | --- | --- |
| [Remove Item] | 2 | Wireless Port | $200.00 |
| [Remove Item] | 2 | ABC Computer | $600.00 |

164

Subtotal  $800.00
Tax       $10.00
Total     $810.00

166 —[ Approve Order ]     [ Deny Order ] ~168

WEBSITE USER ACCOUNT LINKING

CROSS-REFERENCE TO RELATED APPLICATIONS

This application is a continuation of U.S. patent application Ser. No. 11/453,527 filed Jun. 15, 2006, which claims the priority of U.S. Provisional Application No. 60/697,131 filed Jul. 7, 2005, the contents of which are herein incorporated by reference.

BACKGROUND OF THE INVENTION

The present invention relates to a method to facilitate monitoring the use of a website posted on the Internet by an organization having multiple users accessing the website, and particularly to a method for linking a plurality of website user accounts directly or indirectly related to said organization to facilitate monitoring by authorized personnel of the organization.

Typically, a business enterprise, governmental entity or other organization may have multiple personnel who access the commercial website of a supplier or other entity for the acquisition of goods and/or services. These personnel access the website on behalf of their own organization which, for example, might be a division or subsidiary of a parent company or organization. As a result, the commercial website will have separate accounts for each of the divisions or subsidiaries of the parent. In some cases, the supplier may well have a number of commercial websites offering their goods and services. For example, the supplier may have separate websites in different countries. Because of the number of separate accounts that may be involved it is difficult for an organization to monitor all of the activities of the personnel of its various related organizations in accessing its suppliers' websites.

It is known to provide access on a commercial website to various accounts of an organization that have the same billing address. Presently, however, the data for each account is made available only on an individual basis. In other words the data for the various accounts is not made available in aggregate form. There is therefore a need for a method of aggregating the data of various accounts of related organizations to make such data available for monitoring by authorized personnel of those organizations.

SUMMARY OF THE INVENTION

In one embodiment, the invention is of a method for linking separate accounts of a commercial website on the Internet which comprises establishing a tree structure defining the relationship of the various accounts in the tree, obtaining approval of the tree structure by authorized personnel responsible for the accounts, and linking the separate accounts in accordance with the relationship defined by the approved tree structure. In a preferred form the step of establishing a tree structure is performed on-line.

In another embodiment, the invention includes a method for linking separate accounts on a commercial website on the Internet which comprises selecting various accounts to be linked while connected to said website, selecting data parameters from a plurality of data parameters to be included in aggregated form from the selected accounts, and aggregating data for the selected data parameters from the selected accounts. In a preferred form the method includes providing at least one screen for simultaneous viewing of the aggregated data for the selected accounts by a user of the website who is authorized to access the aggregated data.

In a further embodiment, the invention includes a method for controlling the purchase of goods or services from a commercial website on the Internet by users from a plurality of separate accounts within an organization. The method comprises establishing a tree structure defining the relationship of the various accounts within the organization, linking the separate accounts in accordance with the relationship defined by the tree structure, and establishing a plurality of rules regarding the authority for users to purchase goods or services from said commercial website, and assigning at least one group of users to whom the rules apply. In a preferred form, at least one of the rules may preclude a user from checking out and completing the purchase if the proposed purchase exceeds, for example, a certain total dollar amount. In another preferred form, at least one of the rules may require approval by at least one additional person selected to approve or deny purchases that exceed the restriction of that rule. In still another preferred form, a plurality of rules are arranged in ascending order so that a person selected for review of a purchase represents an account at one of the levels in the tree structure and a second person selected for review of said purchase represents an account at a higher level in the tree structure than the first mentioned level therein.

BRIEF DESCRIPTION OF THE DRAWINGS

FIG. 10 is a sample computer screen showing the functions of viewing, approving, denying and editing of orders by an authorized reviewer.

DETAILED DESCRIPTION OF THE PREFERRED EMBODIMENTS

Figure 1:
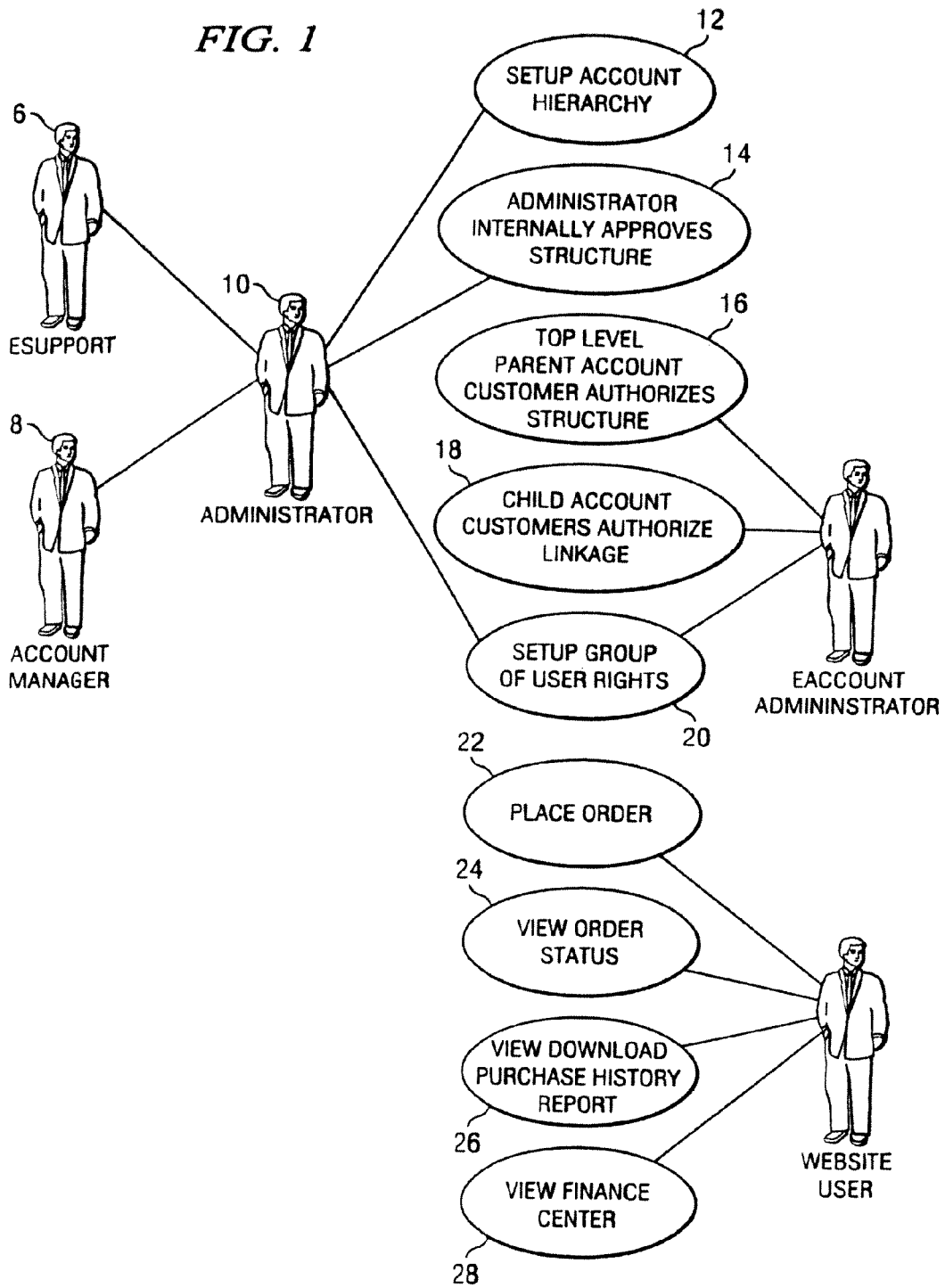
FIG. 1 is a schematic illustration of a method of establishing linking of website accounts of related organizations.

FIG. 1 illustrates a sample procedure for linking the accounts of related organizations that have personnel accessing a commercial website. The commercial website may be maintained by a supplier of goods and/or services to customers that include business enterprises, government entities or other organizations. Its customers may include a parent company having many subsidiary companies, with each of those subsidiary companies having various subsidiaries of their own. Each subsidiary typically will have a separate account established with the commercial website. In addition, each parent and subsidiary may choose to have separate accounts for its headquarters and each of its divisions or plants. Accordingly, there may be a number of separate accounts for the various organizations that are directly or indirectly related to a parent organization. Referring to FIG. 1, E-support personnel 6 or account managers 8 of the commercial website report to website administrator 10. In response to a request from a customer, E-support personnel 6 or account managers 8 propose a hierarchy or tree structure 12 and obtain internal approval of the tree structure by website administrator 10. The steps taken to initially set up the tree structure will be described in greater detail below. After internal approval 14 of the proposed tree structure, approval of the responsible authorities 16 of the parent customer organization and each of the related customer organizations 18 is obtained for the proposed linking of the accounts of those organizations. When all necessary approvals of the customer organizations are obtained then website administrator 10 and an authorized customer administrator set up group or user rights 20 identifying personnel authorized to access various databases of the linked accounts, for example, place order 22, order status 24, purchase history 26, and payments or finance 28.

Figure 2:
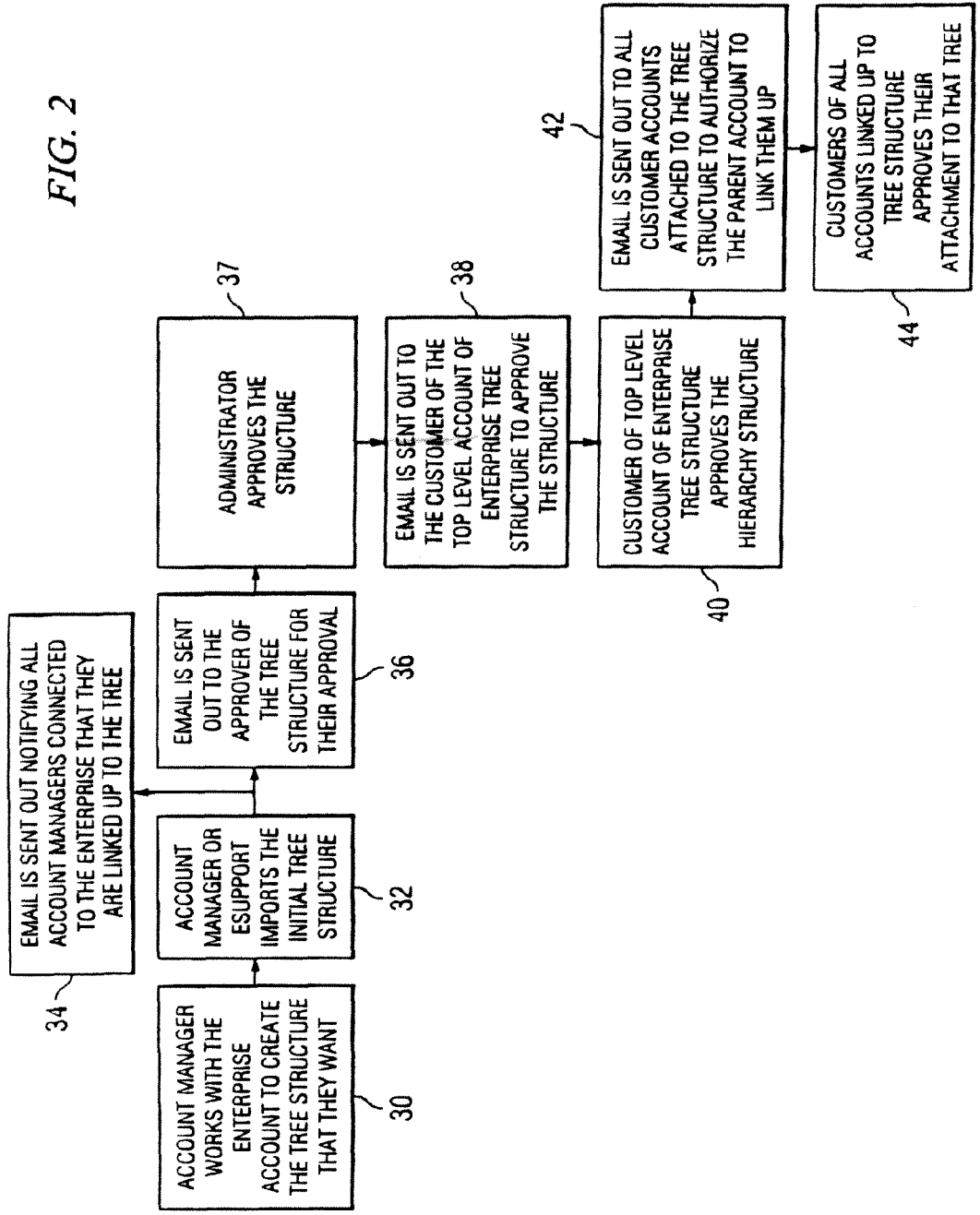
FIG. 2 is a block diagram of an approval process for establishing a website hierarchy or tree structure of linked accounts.
Figure 5:
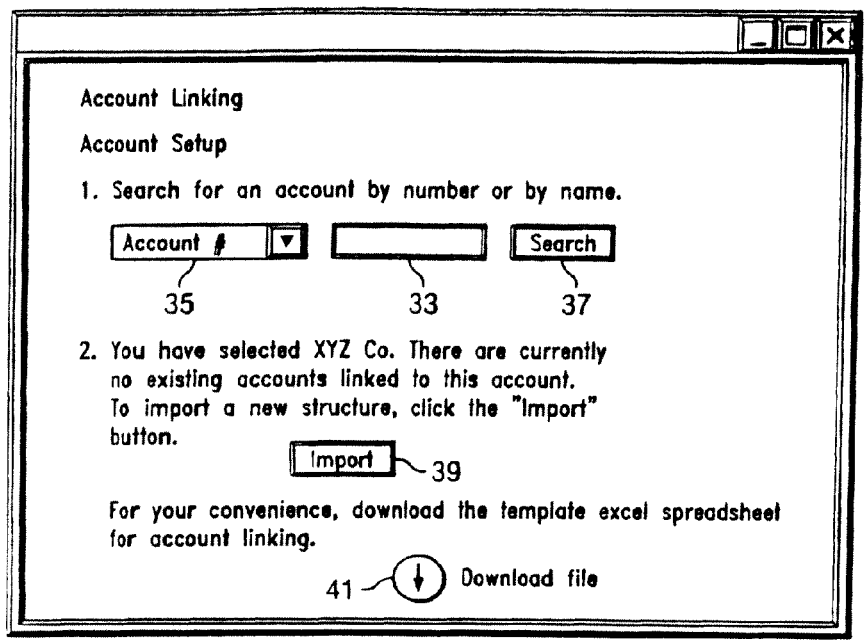
FIG. 5 is a sample computer screen showing options for linking various accounts of an organization.
Figure 6:
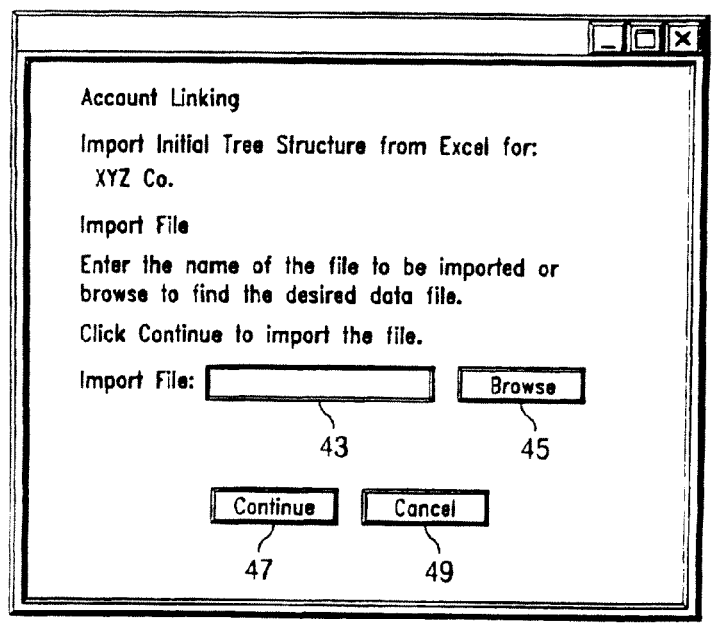
FIG. 6 is a sample computer screen for importing accounts to be linked in the database.

FIG. 2 provides additional details of the account linking approval process. One or more website account managers work with representative of the customer organization to create the tree structure 30 that the customer wants to have of its various accounts. The account manager or technical support personnel then imports 32 the initial tree structure into the website using appropriate computer screens designed for that purpose. A typical computer screen for establishing a tree structure is shown in FIG. 5. The screen has a search box 33 for entry of an account number or name and a drop down menu 35 to select account number or name. A search button 37 is provided for searching for the account number or name entered in the search box. If an account is selected which has a tree structure, then the tree structure will be displayed. If a tree structure does not exist for that account, then a message is displayed stating this and the ability to import the initial tree structure is provided by import button 39. The account managers are able to download an EXCEL spread sheet using a download button 41 and fill it out with their customers and then import them as linked accounts. The spread sheet contains field columns for each child account number and its corresponding parent account number. A sample computer screen for accomplishing import of the files to be linked in the database is shown in FIG. 6. A search box 43 is provided for entry of an account number or name. A browse button 45 is also provided and a new window pops up with options to browse for the various accounts in the database. A continue button 47 is provided to import the account selected on the pop up window and a cancel button 49 is provided to cancel the import. Referring again to FIG. 2, upon completion of the proposed initial tree structure, notice 34 is then sent to all of the website account managers indicating that their customer accounts are linked up to the tree. The notice may include indication of any discrepancies in the data or data format of a particular account with respect to other accounts in the tree so that appropriate steps can be taken to correct any such discrepancies. Communication 36 is then made with a responsible authority of the website seeking internal website approval of the tree structure. After such internal approval, a communication 38 is sent to the customer of the top level account for approval of the tree structure. After approval 40 by the top level customer account, communications 42 are sent to all of the customer accounts attached to the tree structure to seek their authorization to link them to the tree 44. Typically all of the communications can be conducted by e-mail to expedite the approval process. After completion of the initial tree structure maintenance is provided by a computer screen containing add account or delete account buttons.

Figure 3:
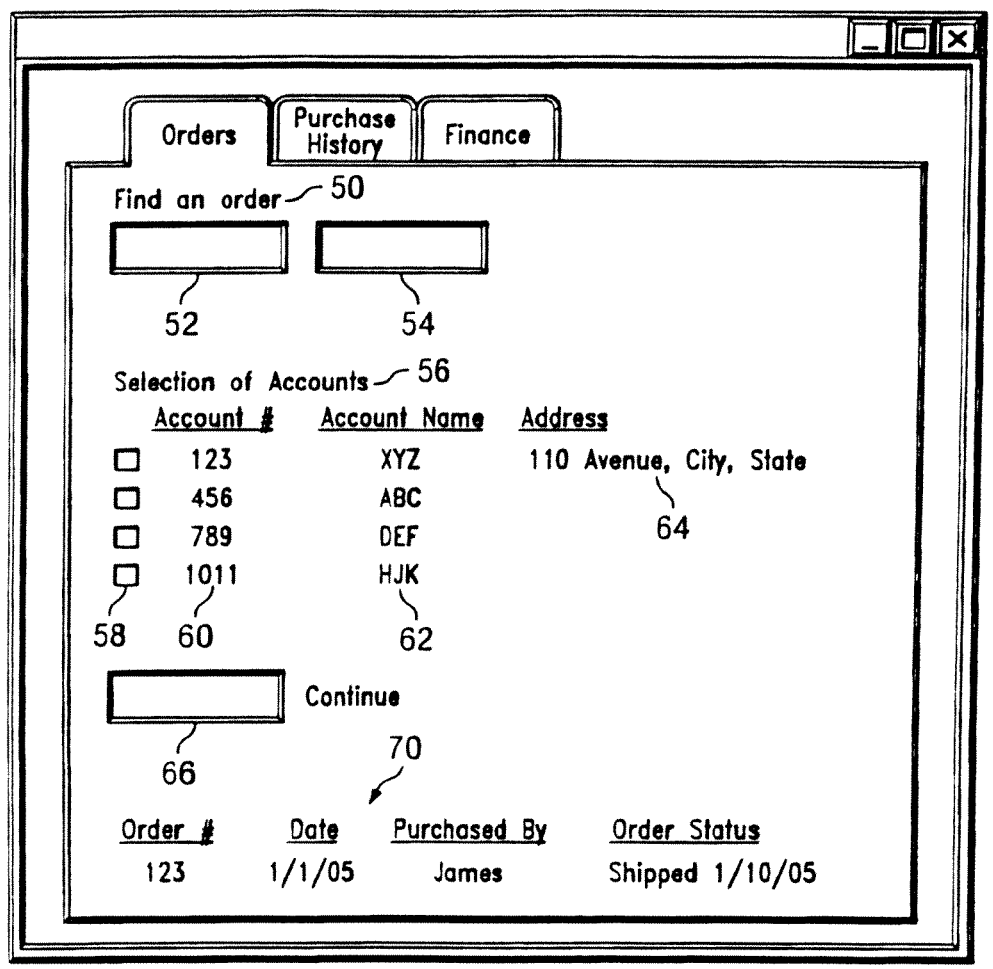
FIG. 3 is a sample illustration of a computer screen designed to enable an authorized user to select available accounts of related organizations to be linked for creating specific reports.

FIG. 3 is a sample illustration of a computer screen for enabling an authorized customer user to select available accounts of related organizations to be linked for creating specific reports of data concerning those organizations. For example, if the user wants to view the status of orders placed by personnel of its related organizations for goods or services on the website, the user will have the ability to select multiple accounts to view data concerning order status. FIG. 3 shows a sample computer screen for this purpose. The following fields are displayed on the order status page: For locating a particular order a find order heading 50 is displayed with a search text box 52 provided below the heading. Button 54 adjacent the search text box enables the user to search for the particular order described in the text box. According to this invention, a new heading 56 is provided to enable selection of accounts from the list below of related organizations. Check boxes 58 are provided for clicking on the selected accounts. Account numbers 60 and account names 62 are provided to the right of each check box, along with the account address 64. Below the list of accounts, a continue button 66 is provided for linking the data from the selected accounts. After clicking the continue button, a list 70 of orders showing the status of each of them is displayed. The list includes all orders for the selected accounts so that order status for all of those accounts may be viewed simultaneously in aggregate. Usually the orders will be grouped by account and then particular order status, for example, invoiced and shipped. Other arrangements of the aggregate data can be provided as desired.

Figure 4:
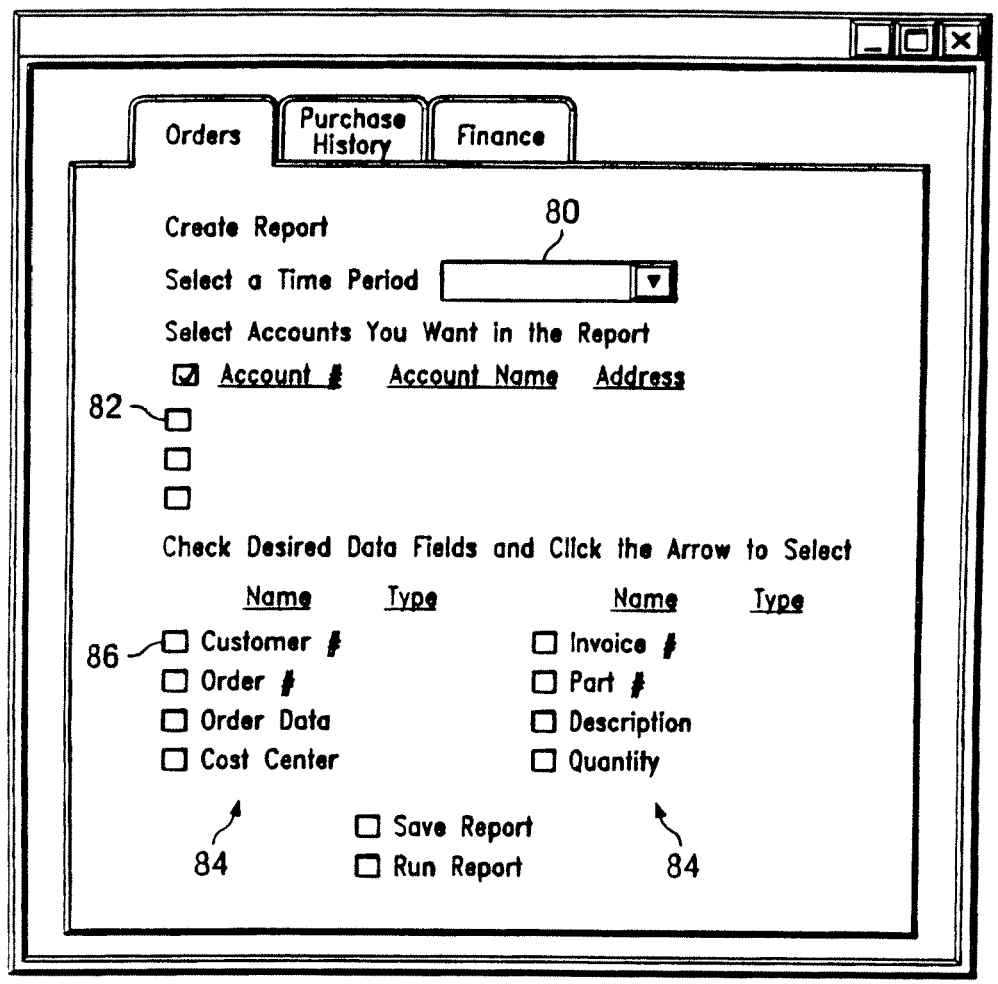
FIG. 4 is a sample computer screen showing aggregated data of selected related organizations and selected data parameters.

FIG. 4 is a sample computer screen for providing an authorized customer user the ability to select various accounts of related organizations for inclusion in a customized report to be created by the user. The screen includes a drop down menu 80 for selecting a time period for the report, with options to select, for example, previous day, month-to-date, last 6 full months, current year, and previous year or years. Below drop down menu 80, check boxes 82 are provided for the selection of accounts to be included in the report. Account number, account name and account address are provided to the right of each check box to identify the available accounts. Below the list of available accounts, a list of data fields 84 is provided. Each data field has a check box 86 which the user may click on to select the data fields to be included in the report. Such data fields may include, for example, customer number, order number, order date, cost center, invoice number, and part or item identifying number, description, quantity, and price. Once the accounts and data fields have been selected a save report button is provided and below that a run report button. When the run report button is clicked, a screen will be displayed of aggregated data of the various selected data fields for the selected accounts. Thus, a method is provided for creating customized reports for selected accounts of related organizations.

Figure 7:
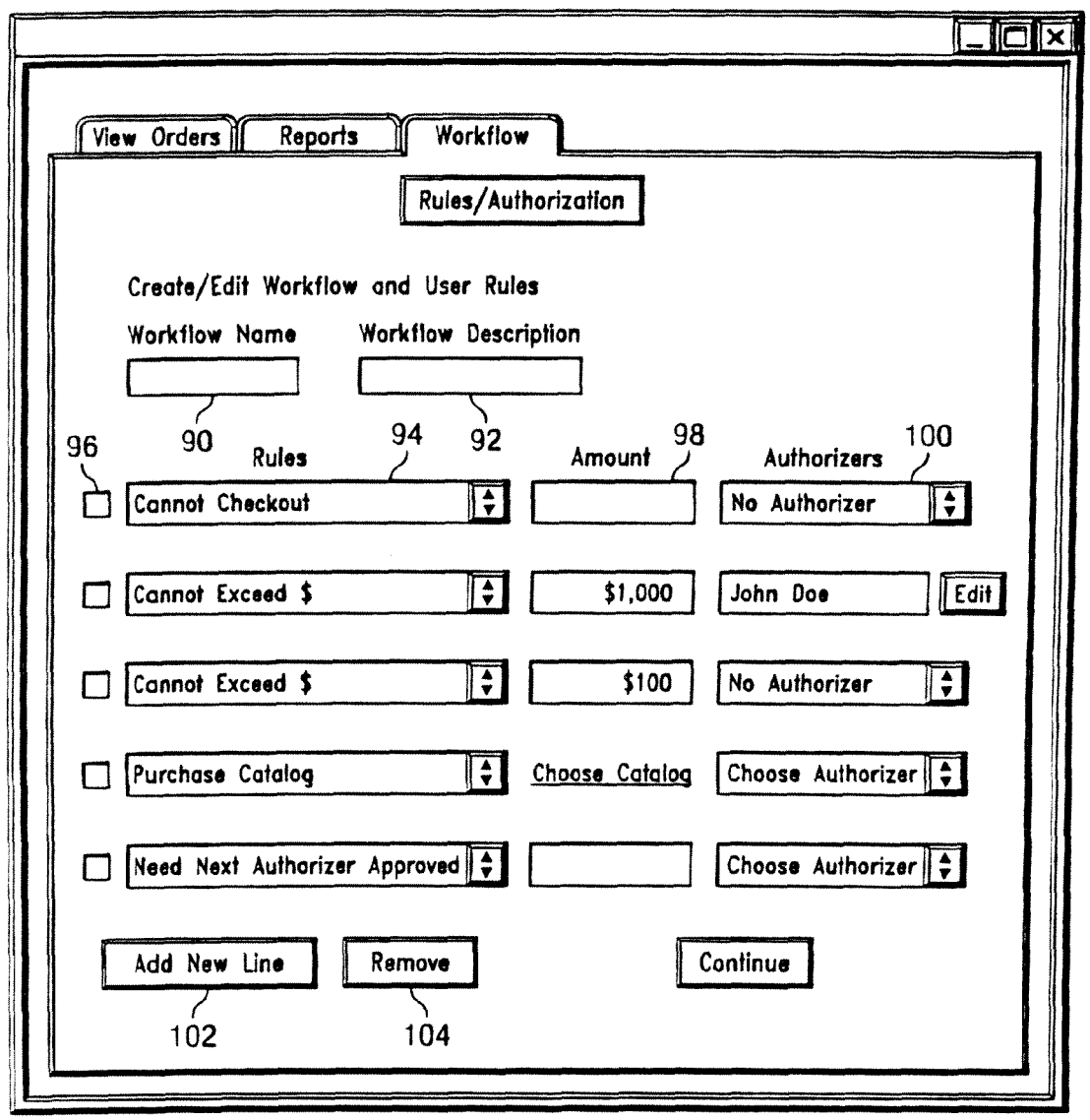
FIG. 7 is a sample computer screen for creating a combination of workflow rules by selecting a rule, entering the amount or criteria and choosing the authorizer for review and approval or denial of orders exceeding the restriction or requirement of the rule.

In addition to being able to create reports for monitoring the activity of selected accounts of related organizations, the customer may also be provided with the ability to regulate the purchase of goods or services by users of the various linked accounts from a central authority such as an administrator of the parent customer organization. When a tree structure has been approved and the various accounts have been linked, an administrator of the parent customer organization can create a workflow which consists of rules regulating the purchase of goods or services from the website by users from the various linked accounts. FIG. 7 shows a sample computer screen for creating a set of rules for a workflow. The rules may include, for example, a restriction on the total monetary amount that a user is authorized to purchase, a maximum unit price for an individual item, a list of items that the user is authorized to purchase, or a catalog from which the user may select items for purchase. For each rule an authorizer may be selected to allow the user to make a purchase when an order exceeds any of the rules. A rule without an authorizer may also be specified with the implication that an order that violates that rule cannot be approved. Rules involving total order amounts or individual line item prices are arranged in increasing order so that, for example, orders over $5,000 can only be setup to follow a rule that specifies a total order restriction with a smaller amount such as $2,000. In FIG. 7, boxes 90 and 92 are provided for typing in the name of a workflow and a description of the workflow, respectively. Dropdown menus 94 are provided for creating various types of rules that may be included in a workflow. A box 96 is provided to the left of each menu or letter identifying the ruled. To the right of each menu a space 98 is provided for typing an amount related to the rule. To the right of space 98 a dropdown menu 100 is provided for choosing an authorizer to review and approve or deny a purchase that exceeds the rule. The authorizers listed in the dropdown menu are selected from all available users on a separate computer screen described below. The first line in menu 94 shows a rule entitled "cannot checkout". No authorizer is selected indicating that the purchase which exceeds this rule cannot be completed. The second line in menu 94 shows a rule that the purchase cannot exceed a specific dollar amount, for example, $1,000, without approval by an authorizer. The fourth line in menu 94 indicates a rule that a purchase cannot be made outside of a catalog without approval by a person selected as an authorizer for that rule. The fifth line in menu 94 shows that approval of the next authorizer is required for a particular purchase, thus allowing the administrator to require authorization of a purchase by a person representing, for example, the parent organization. Buttons 102 and 104 are provided to add a new line or to remove a line for adding or deleting rules.

Figure 8:
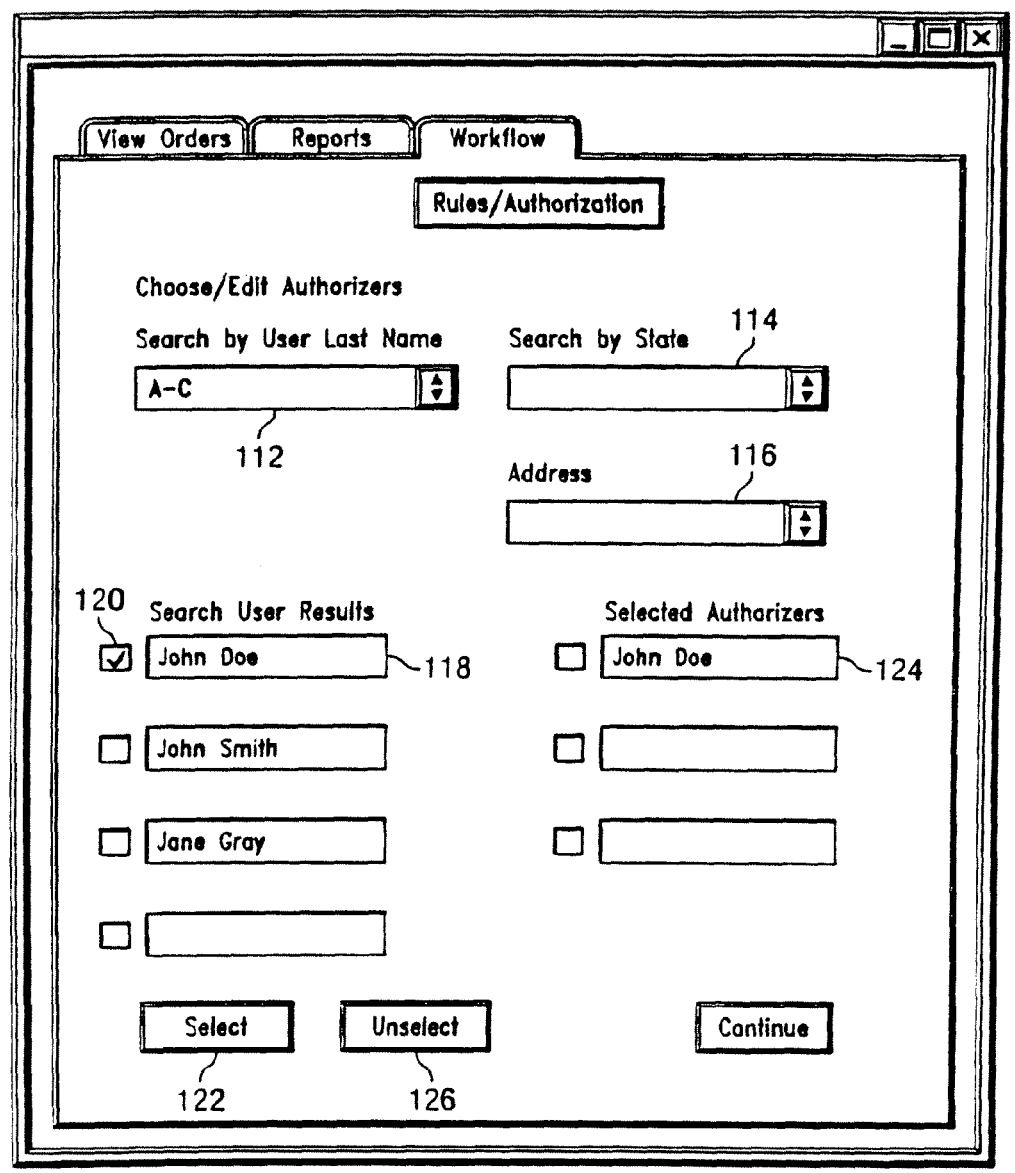
FIG. 8 is a sample computer screen for choosing authorizers from a list of available users in the organization.

FIG. 8 shows a sample computer screen for selecting authorizers from a list of all available users of the website. Search box 112 enables a search by user name. Search boxes 114 and 116 enable searches by state or address. Searches by other identifiers may also be included such as the organization which the user represents, the user's title, or other category. List 118 displays the names and addresses of users found using the search boxes described above. Spaces 120 are provided for identifying users who are to be selected as authorizers when button 122 labeled "Select" is pressed. The selected authorizers are listed in menu 124. Button 126 labeled "Unselect" enables the removal of an authorizer from the selected authorizer list.

Figure 9:
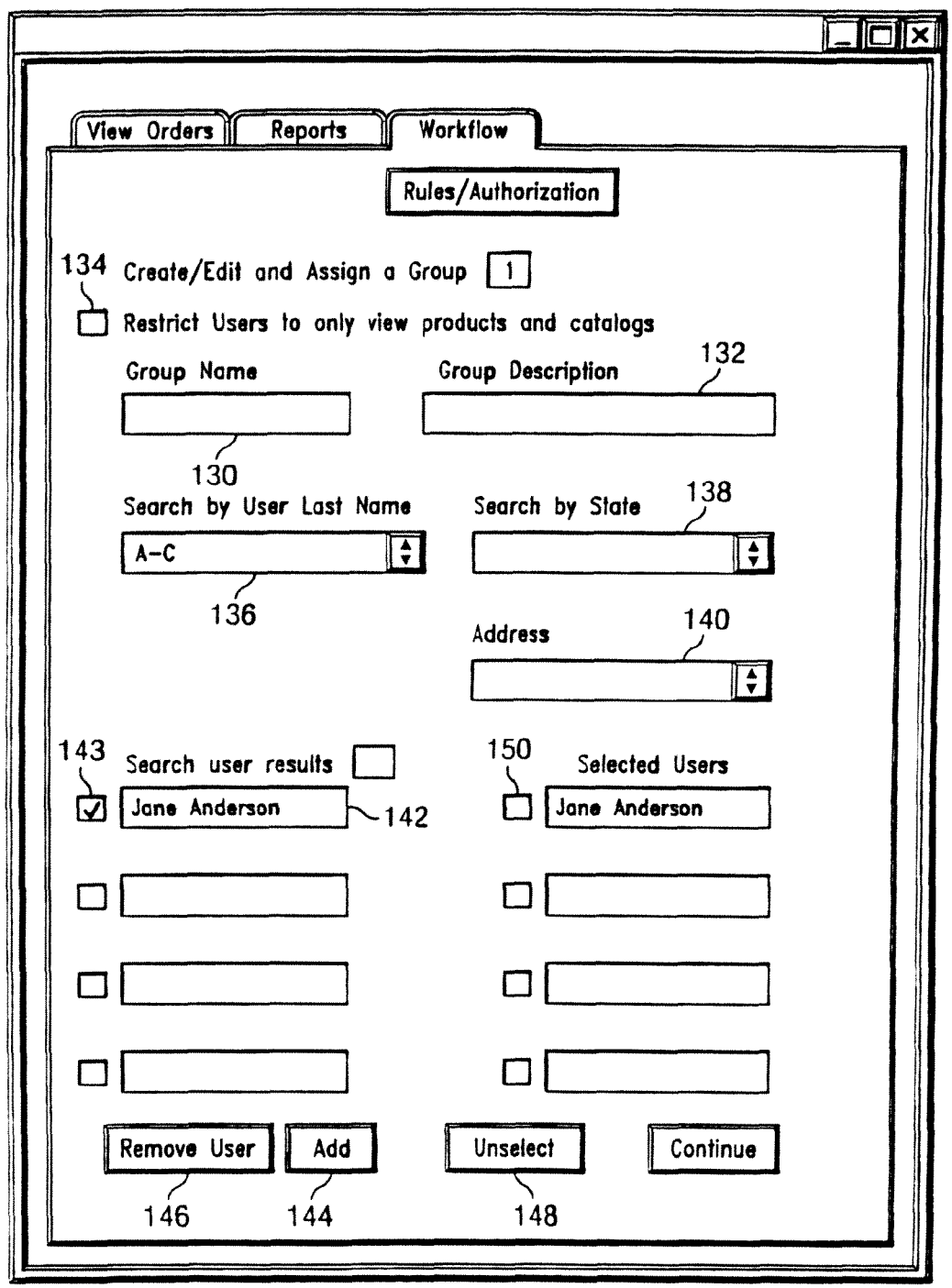
FIG. 9 is a sample computer screen for creating or editing a group and the users that are contained within the group.

Once a workflow has been created, it can be associated with any of various groups within an organization. A group can be selected or unselected by checking or un-checking a checkbox next to it in an available group list. FIG. 9 shows a sample computer screen for creating or editing a group and the users that are contained within the group. Box 130 is provided for entry of a name for the group. Box 132 provides a space for typing a description of the group. If the administrator wants to restrict the users in the group so that they can only view products and catalogs, box 134 is provided which may be checked for that purpose. Box 136 is provided for search for a user by the user's last name. Box 138 enables a search by location, for example, the state where users are located. Box 140 provides a search for users at a specific address. The search results are shown in the Search Results column 142. A checkbox 143 is provided next to each user's name for selecting that user for inclusion in the group. Add button 144 is provided for adding the checked users to the list of users in the group. Button 146 enables removal of a user from the search results list. The selected users are listed in the selected user list 144. Button 148 enables un-selection of users from the selected user list when a checkbox 150 is checked. Using this computer screen the customer administrator is able to create user groups or edit existing user groups.

In operation a user places an order when connected to the website. If approval is required the order is listed as "waiting for review" on a screen that is accessible to an authorizer. The authorizer is able to click on the order number to bring up a screen for review of the details of the order. FIG. 10 is a sample computer screen that an authorizer might view for review of the purchase order. The order number and date the order was placed are shown at the top of the screen. Below the order number the address from which the order was billed and the billing address are shown along with a shipping address, shipping method and payment method. Below each of these listings a button 158 is provided for edit of the information contained in the space above. The history of the order is shown in box 160 where the Date, Name, Status, and Rule that triggered the need for approval are provided along with any comments. Prior review and approval is indicated as shown on the second line and pending approval on the third line. The products ordered are listed on separate lines in box 162 below box 160. Buttons 164 enable the authorizer to remove any item listed on a particular line in box 162. Buttons 166 and 168 are provided at the bottom of the screen to approve or deny the order. If the order is denied a communication, for example, by e-mail is sent to the person who placed the order and any previous authorizers indicating the reason for denial.

While one or more preferred embodiments of the invention have been identified, other configurations and modifications can be provided within the scope of the present invention.

What is claimed:

1. A method for managing a plurality of commercial website accounts maintained by a supplier of goods or services, the method comprising:

receiving a structure at a computing device maintained by the supplier of goods or services via a first computer screen, wherein the structure specifies a relationship between a first one of the plurality of commercial website accounts and a second one of the plurality of commercial website accounts, so that the first one of the plurality of website accounts is configured to be a parent account of the second of the plurality of website accounts defining a child account;

linking the child account and the parent account in accordance with the received structure in response to a command received via the first computer screen;

receiving a rule that regulates a purchase of goods or services by a user of the child account via a second computer screen, wherein the received rule specifies an action associated with a user of the parent account;

automatically detecting that the user of the child account has placed an order at the commercial website; and processing the order in accordance with the rule and the structure.

2. The method of claim 1, wherein the received rule specifies at least one of a restriction on a total monetary amount, a maximum unit price for an item, and a list of items that the user of the child account is authorized to purchase.

3. The method of claim 1, wherein the received rule includes a requirement that the purchase be authorized by the user of the parent account under certain conditions.

4. The method of claim 3, wherein processing the order in accordance with the rule and the structure includes:
generating a waiting-for-review screen for the user of the parent account; and
providing details of the placed order in response to receiving a command from the user of the parent account via the waiting-for-review screen.

5. The method of claim 3, wherein the received rule includes a further requirement that the purchase also be authorized by an authorizer different from the user of the parent account.

6. The method of claim 3, further comprising:
receiving a selection of a group of users of respective ones of the plurality of commercial website accounts; and
applying the received rule to each of the group of users.

7. The method of claim 1, wherein receiving the structure includes receiving a spreadsheet uploaded via the computer screen.

8. The method of claim 1, further comprising:
generating a list of two or more of the plurality of commercial website accounts that correspond to respective related organizations in accordance with the received structure;
displaying the list at a third computer screen;
receiving a first selection of a first account included in the list;
receiving a second selection of a second account included in the list;
generating an aggregate report related to the first account and the second account.

9. The method of claim 8, wherein the aggregate report specifies orders for goods or services placed using one of the first account and the second account.

10. The method of claim 8, further comprising:
receiving a selection of several data fields related to the first account and the second account;
wherein generating the aggregate report includes aggregating data according to the received selection of data fields;
wherein the data fields are selected from a set including customer number, order number, order date, cost center, invoice number, item identification number, description, quantity, and price.

11. A method for managing a plurality of commercial website accounts for purchase of goods or services maintained by a supplier of goods or services, wherein each of the plurality of commercial website accounts is associated with data stored as a plurality of data fields; the method comprising:
generating an interactive computer screen;
receiving a selection of a first one of the plurality of commercial website accounts via the computer screen;
receiving a selection of a second one of the plurality of commercial website accounts via the computer screen, wherein the first one of the plurality of commercial website accounts and the second one of the plurality of commercial website accounts are for use by related organizations;
receiving a first selection of a first one of the plurality of data fields via the computer screen;
receiving a second selection of a second one of the plurality of data fields via the computer screen; and
generating aggregate data related to activity of the first one of the plurality of commercial website accounts and the second one of the plurality of commercial website accounts in accordance with the first selection and the second selection based on the data stored at a computing device maintained by the supplier of goods or service.

12. The method of claim 11, wherein the plurality of data fields are selected from a set including customer number, order number, order date, cost center, invoice number, item identification number, description, quantity, and price.

13. The method of claim 11, wherein generating the interactive computer screen includes providing the interactive computer screen to an authorized user.

14. The method of claim 13, further comprising receiving a tree structure that specifies a relationship between the authorized user and each of the first one of the plurality of commercial website accounts and the second one of the plurality of commercial website accounts.

15. The method of claim 11, further comprising receiving a selection of a time period within which the activity of the first one of the plurality of commercial website accounts and the second one of the plurality of commercial website accounts occurs.

16. A commercial website server for a supplier of goods or services, wherein the commercial website server includes a set of computer-executable instructions stored thereon, the commercial website server comprising:
a computer further comprising:
an interface to a database at a computing device maintained for the supplier of goods or services that stores a plurality of commercial website accounts for purchase of goods or services from the supplier of goods or services;
a computer screen including:
a first control to receive a structure that specifies a relationship between a first one of the plurality of commercial website accounts and a second one of the plurality of commercial website accounts, so that the first one of the plurality of website accounts can be configured to be a parent account of the second of the plurality of website accounts defining a child account;
a second control to link the child account and the parent account in accordance with the received structure; and
a third control to receive a rule that regulates a purchase of goods or services by a user of the child account via a second computer screen, wherein the received rule specifies an action associated with a user of the parent account, wherein the commercial website server is adapted to automatically detect that the user of the child account has placed an order at the commercial website and process the order in accordance with the rule and the structure.

17. The commercial website server of claim 16, further comprising:
a second computer screen including:
a fourth control to receive a selection of the second one of the plurality of commercial website accounts;
a fifth control to receive a selection of a third one of the plurality of commercial website accounts, wherein the second one of the plurality of commercial website accounts and the third one of the plurality of commercial website accounts are for use by related organizations; and
a sixth control to generate aggregate data related to activity of the second one of the plurality of commercial website accounts and the third one of the plurality of commercial website accounts.

18. The commercial website server of claim 16, wherein the second computer screen is accessible to a user of the first one of the plurality of commercial website accounts.

19. The commercial website server of claim 16, wherein each of the plurality of commercial website accounts is associated with data stored as a plurality of data fields;
wherein the second computer screen further includes:
a seventh control to receive a first selection of a first one of the plurality of data fields via the computer screen;
an eighth control to receive a second selection of a second one of the plurality of data fields via the computer screen; and wherein
the aggregate data is generated according to the first selection and the second selection.

20. The commercial website server of claim 16, wherein the rule specifies at least one of a restriction on a total monetary amount, a maximum unit price for an item, and a list of items that the user of the child account is authorized to purchase.

* * * * *